(12) United States Patent
Nagata et al.

(10) Patent No.: US 12,100,844 B2
(45) Date of Patent: Sep. 24, 2024

(54) STAINLESS FOIL CURRENT COLLECTOR FOR SECONDARY BATTERY POSITIVE ELECTRODES

(71) Applicant: NIPPON STEEL CHEMICAL & MATERIAL CO., LTD., Tokyo (JP)

(72) Inventors: Tatsuo Nagata, Tokyo (JP); Hiroto Unno, Tokyo (JP); Masahiro Fukuda, Tokyo (JP); Naoki Fujimoto, Tokyo (JP)

(73) Assignee: NIPPON STEEL CHEMICAL & MATERIAL CO., LTD., Tokyo (JP)

( * ) Notice: Subject to any disclaimer, the term of this patent is extended or adjusted under 35 U.S.C. 154(b) by 814 days.

(21) Appl. No.: 17/255,945

(22) PCT Filed: Jun. 27, 2019

(86) PCT No.: PCT/JP2019/025737
§ 371 (c)(1),
(2) Date: Dec. 23, 2020

(87) PCT Pub. No.: WO2020/004595
PCT Pub. Date: Jan. 2, 2020

(65) Prior Publication Data
US 2021/0273232 A1    Sep. 2, 2021

(30) Foreign Application Priority Data

Jun. 27, 2018    (JP) ................................ 2018-122407

(51) Int. Cl.
*H01M 4/66*    (2006.01)
*H01M 4/02*    (2006.01)
(Continued)

(52) U.S. Cl.
CPC ........... *H01M 4/669* (2013.01); *H01M 4/131* (2013.01); *H01M 4/134* (2013.01); *H01M 4/505* (2013.01);
(Continued)

(58) Field of Classification Search
CPC ...... H01M 4/669; H01M 4/131; H01M 4/134; H01M 4/505; H01M 4/525; H01M 4/662; H01M 2004/028
See application file for complete search history.

(56) References Cited

U.S. PATENT DOCUMENTS 4,424,436 A * 1/1984 Humberstone ......... F27B 14/10
219/146.1
2005/0271938 A1 * 12/2005 Suzuki .................. H01M 4/587
429/185

(Continued)

FOREIGN PATENT DOCUMENTS

DE    3918963 A1 * 12/1989
EP    3 480 334 A1    5/2019
(Continued)

OTHER PUBLICATIONS

Machine Translation of DE-3918963-A1 (Oct. 6, 2023) (Year: 2023).*

(Continued)

*Primary Examiner* — Matthew J Merkling
(74) *Attorney, Agent, or Firm* — Birch, Stewart, Kolasch & Birch, LLP

(57) ABSTRACT

The present invention has as its technical issue to secure not only mechanical strength but also conductivity by increasing the contact area with the positive electrode active substance or positive electrode mixture while also securing corrosion resistance to alkali or an electrolytic solution when applying stainless steel foil to a current collector for a positive (Continued)

electrode of a secondary battery so as to deal with the increasingly higher capacities and smaller sizes and lighter weights of lithium ion secondary batteries and has as its object the provision of a current collector for a positive electrode of a secondary battery using such stainless steel foil. The invention is a current collector comprised of stainless steel foil made to decrease in surface hardness while obtaining corrosion resistance by giving it a chemical composition decreased in Cr and containing a trace amount of Sn or a chemical composition containing Ti, a thickness of 1 μm or more and 20 μm or less, and a surface hardness of a Vickers hardness of Hv300 or less applied to a secondary battery positive electrode. When measuring an electrical contact resistance between the positive electrode active substance and the current collector after pressing, when the filling ratio of the positive electrode mixture is 74%, the electrical contact resistance is 100Ω or less. In particular, that effect is exhibited when the density of the positive electrode mixture is 3.0 g/cm$^3$ or more (filling ratio: 50% or more).

7 Claims, 2 Drawing Sheets

(51) Int. Cl.
    *H01M 4/131*     (2010.01)
    *H01M 4/134*     (2010.01)
    *H01M 4/505*     (2010.01)
    *H01M 4/525*     (2010.01)

(52) U.S. Cl.
    CPC ........... *H01M 4/525* (2013.01); *H01M 4/662* (2013.01); *H01M 2004/028* (2013.01)

(56) References Cited

U.S. PATENT DOCUMENTS

2019/0074519 A1     3/2019    Yagishita et al.
2022/0243309 A1*    8/2022    Yano ..................... H01M 4/66

FOREIGN PATENT DOCUMENTS

| JP | H 09-022701 A | | 1/1997 |
|---|---|---|---|
| JP | 2003178766 A | * | 6/2003 |
| JP | 2003-257384 A | | 9/2003 |
| JP | 2005-310424 A | | 11/2005 |
| JP | 2008-133498 A | | 6/2008 |
| JP | 2009-167486 A | | 7/2009 |
| JP | 2010-33782 A | | 2/2010 |
| JP | 2011-134690 A | | 7/2011 |
| JP | 2013-101919 A | | 5/2013 |
| JP | 2013-222696 A | | 10/2013 |
| JP | 2015-97173 A | | 5/2015 |
| KR | 20150014124 A | * | 2/2015 |
| WO | WO 2017/081834 A1 | | 5/2017 |
| WO | WO 2018/008658 A1 | | 1/2018 |

OTHER PUBLICATIONS

Machine Translation of JP-2003178766-A (Oct. 6, 2023) (Year: 2023).*

Machine Translation of KR-20150014124-A (Oct. 6, 2023) (Year: 2023).*

* cited by examiner (a)

(b)

STAINLESS FOIL CURRENT COLLECTOR FOR SECONDARY BATTERY POSITIVE ELECTRODES

FIELD

The present invention relates to a current collector using stainless steel foil used for a positive electrode of a secondary battery such as a lithium ion battery.

BACKGROUND

An electrode of a secondary battery such as a lithium ion battery is comprised of an electrode layer and a current collector. In the case of a lithium (Li) ion battery, the electrode layer is comprised of an active substance able to store and release Li ions at the time of charging and discharging, a conductive aid aiding improvement of electron conductivity, and a binder for binding active substances together or an active substance and the current collector. The current collector has the role of supporting the active substance and running current to a lead wire connecting the electrode layer with the outside.

Currently, as a positive electrode active substance of a secondary battery, lithium cobalt oxide ($LiCoO_2$, hereinafter referred to as "LCO"), a three element material comprised of $LiNi_{1/3}CO_{1/3}Mn_{1/3}O_2$ (hereinafter referred to as "NCM"), lithium manganese oxide ($LiMn_2O_4$, hereinafter referred to as "LMO"), an Ni-based material comprised of $LiNi_{0.8}Co_{0.15}Al_{0.05}O_2$ (hereinafter referred to as "NCA"), and lithium ferrophosphate ($LiFePO_4$, hereinafter referred to as "LFP") have been used. Further, as a current collector, the highly conductive aluminum (Al) foil has been used.

These active substances may, as needed, have conductive aids or binders added to them (mixtures of positive electrode active substances and conductive aids and binders also included, these being referred to as "positive electrode mixtures") and, further, may have solvents (for example, NMP (n-methylpyrrolidone) blended in to produce a slurry which is then coated and dried on a current collector material of Al foil which is in turn then pressed to make the contact area between particles of the active substance and between the particles and current collector increase and lower the resistance for use in a secondary battery.

On the other hand, in recent years, secondary batteries have been used not only for mobile equipment, but also electric vehicles etc. For this reason, higher outputs and longer lifetimes have been rapidly increasingly demanded. For example, the density of positive electrode mixtures of lithium ion secondary batteries mounted in early electric vehicles was 2.58 $g/cm^2$ (filling ratio of about 50%), but the density of the positive electrode mixtures demanded in recent electric vehicles has risen to 3.64 $g/cm^2$ (filling ratio of 70% or more). Increasing the filling ratio of positive electrode mixtures is being demanded for further increasing capacities in the future.

For this reason, for positive electrode current collectors, materials which will not break or deform even when subjected to a high press pressure, from which the positive electrode mixture will not peel off after pressing, and which are excellent in conductivity are being sought. The Al foil which has been conventionally used is high in conductivity, but is low in mechanical strength. When subjected to a high press pressure, wrinkles occur, holes form, or breakage (tearing) occurs. If such a situation arises, the manufacturing yield of electrodes ends up greatly falling. In addition, sometimes this grows into serious problems affecting the battery's characteristics. Further, reduction of the internal resistance of the battery so that even if running a large current, the battery voltage will not fall is simultaneously being demanded. For this reason, it is simultaneously asked that the positive electrode mixture suitably penetrate the current collector at the time of pressing and that the electrical contact resistance be low. That is, the current collector must be a high strength one which does not break even if the positive electrode mixture penetrates into it. Therefore, a new current collector for positive electrodes is sought so as to achieve the object of smaller size and higher capacity of the secondary battery.

Further, predicated on being mounted in electronic equipment and automobiles, current collectors not contributing to transfer of Li ions are being asked to be made as thin in thickness and as light in weight as possible. In particular, for reducing the size, reduction of the thickness is essential. The aluminum foil (Al foil) being currently used is approaching its limit in terms of mechanical strength. Proposals of new materials going back to the materials for forming the secondary batteries are being sought.

CITATIONS LIST

Patent Literature

[PTL 1] Japanese Unexamined Patent Publication No. 2013-222696
[PTL 2] Japanese Unexamined Patent Publication No. 2013-101919
[PTL 3] Japanese Unexamined Patent Publication No. 2010-33782

SUMMARY

Technical Problem

The current collection materials for positive electrodes contributing to the smaller size and higher capacity of secondary batteries are being asked exhibit mechanical strength (tensile strength, pinhole resistance, etc.) not allowing them to break and not suffering from pinholes or wrinkles even if roll pressed by a high press pressure. At the same time, reduction of the electrical contact resistance between the positive electrode mixture and the current collector is being sought. That is, pressing the positive electrode mixture and positive electrode current collector to make the positive electrode mixture penetrate the current collector, make the contact areas of these increase, and lower the electrical contact resistance is being sought. Along with the higher outputs of secondary batteries, performance preventing the battery voltage from easily falling due to the voltage drop caused by the internal resistance even if running a large current is increasingly being sought. That is, a drop in the contact resistance is being sought. For this reason, it also becomes difficult to make the press pressure a high pressure. Further, by electrons being repeatedly discharged and absorbed from the active substance, the current collector also repeatedly expands and contracts. Along with the higher densities of batteries, such expansion and contraction have become more vigorous. For this reason, in conventional Al foil, the limit has been reached in mechanical strength. Further reduction of thickness is not possible. To solve such a problem, instead of Al foil, use of stainless steel foil is being studied.

In PTL 1, while not current collectors for positive electrodes, application of stainless steel foil to current collectors for negative electrodes has been proposed. Normally, in the case of a negative electrode of a secondary battery, as the negative electrode active substance, a carbonaceous material (graphite-based material) has been used, while as the current collector, copper (Cu) foil has been used. Even if using stainless steel foil for the current collector, since the active substance carbonaceous material also has conductivity, current flows through the carbonaceous material, so the current conduction between the carbonaceous material and the stainless steel foil does not become that much of a problem. Further, a carbonaceous material itself is also soft, so there is little penetration to the current collector and the damage to the stainless steel foil forming the current collector does not become that much of a problem. Due to these, application of stainless steel foil to a negative electrode use current collector has been proposed.

In PTL 2, application of stainless steel foil to not only the secondary battery, but also the current collector of an electrical double-layer capacitor is proposed. In particular, regarding the positive electrode of a secondary battery, as the positive electrode active substance, ferric phosphate-based positive electrode active substances such as LFP have been garnering attention, but to raise the energy density and conductivity, the substances have to be worked by high press pressures. For this reason, high tensile strength whereby the substance will not deform even when press worked and will not be formed with pinholes or wrinkles has been demanded. For this reason, in PTL 2, a current collector material for a power storage device using stainless steel foil with a thickness of 15 μm or less, a tensile strength at 200° C. of 500 MPa or more, a load when a 0.2% strain is generated at a width 10 mm of 50N or more, a breaking load at a width 10 mm of 70N or more, and a range of potential functioning as a current collector of 0 to 4.2V vs. Li+/Li has been proposed.

In PTL 3, ferritic stainless steel having a specially roughened surface is proposed as the negative electrode current collector of a lithium secondary battery. This has as its object to keep the copper foil used for the current collector of the negative electrode from leaching copper (Cu) due to excessive discharge of the battery etc. and this reprecipitating at the time of charging to cause sparks and other critical phenomena. For this reason, it proposes replacement of this with stainless steel as a material with a higher corrosion resistance than copper. However, stainless steel forms a passive film, so compared with copper is increased in contact resistance with the active substance, so to avoid this, it is proposed to make the surface a specially roughened surface.

However, PTL 1 is predicated on a negative electrode current collector. The technical issues involved differ between positive electrodes and negative electrodes. There is no issue in regard to penetration of the active substance due to high press pressure. Therefore, even if just applying stainless steel foil to a positive electrode current collector, there is little penetration by the positive electrode mixture and the contact area cannot be sufficiently secured.

PTL 2 recognizes the issue of increasing the contact area of the positive electrode mixture and the stainless steel foil forming the current collector so as to lower the contact resistance, but makes no specific proposal regarding stainless steel foil and only proposes the possibility of use of stainless steel foil.

PTL 3 has as its object the increase of the contact area by roughening the surface. However, surface roughening means an additional process, so results in higher costs. Furthermore, basically, PTL 3 is also predicated on a negative electrode current collector. The technical issues involved differ between positive electrodes and negative electrodes. The contact resistance with a positive electrode active substance with hardness and the penetration of the positive electrode active substance due to the higher press pressure are not recognized as issues. Further, stainless steel is applied in consideration of the corrosion resistance, but this is actually done for 18Cr steel or 22Cr steel. The deterioration of the corrosion resistance when lowering the Cr is not actually solved as an issue.

A positive electrode current collector is required to exhibit a corrosion resistance different from a negative electrode. For example, when applying NCA or NCM as the positive electrode active substance, mixing with a water-based binder results in the slurry becoming alkaline which causes the Al foil to corrode. Therefore, if applying Al foil to a current collector like in the past, the NCA or NCM is rinsed for use to keep it from becoming alkaline. Further, by rinsing with water, the volume of the NCA or NCM falls and a drop in the battery performance is invited. Further sometimes, for some sort of reason, cracks form in the layer of the positive electrode active substance or positive electrode mixture and the electrolytic solution contacts the current collector. For this reason, a positive electrode current collector is required to have a high corrosion resistance to an alkali or electrolytic solution.

That is, if just applying stainless steel foil to a positive electrode current collector, the mechanical strength can be secured, but the contact area with the positive electrode mixture cannot be secured and sometimes sufficient conductivity cannot be secured as a positive electrode of a secondary battery. On the other hand, if securing the contact area by suppressing the passive film and sacrificing the corrosion resistance, the result no longer functions as a secondary battery. Such a thing becomes a problem when applying stainless steel foil to a positive electrode current collector.

The present invention has as its technical issue to secure not only mechanical strength but also conductivity by increasing the contact area with the positive electrode active substance or positive electrode mixture while also securing corrosion resistance to alkali or an electrolytic solution when applying stainless steel foil to a current collector for a positive electrode of a secondary battery and has as its object the provision of a current collector for a positive electrode of a secondary battery using such stainless steel foil.

Solution to Problem

The inventors engaged in in-depth studies to solve the above technical issue and obtained the following findings:

(a) In general, the surface of stainless steel foil is formed with a passive film of Cr or Ni. The corrosion resistance is secured by this passive film. However, the contact resistance of the stainless steel foil and positive electrode mixture deteriorates due to this passive film. This is because the passive film is hard and the positive electrode mixture cannot break the passive film, so a sufficient contact area cannot be secured. On the other hand, if there is no such passive film, corrosion proceeds due to contact with the electrolytic solution and the function as an electrode falls.

(b) Therefore, the inventors thought that stainless steel foil, which causes the stainless steel foil surface to fall in hardness while enabling the corrosion resistance to be secured, can be applied to a positive electrode current collector. To cause the surface hardness to fall, for example, BA (bright annealing) can be performed, but this becomes expensive cost-wise. For this reason, the inventors intensively worked to develop stainless steel foil low in surface hardness without BA, but having corrosion resistance. As a result, they discovered that if decreasing Cr and including a trace amount of Sn or if including Ti and immobilizing the C (carbon) or N (nitrogen), it is possible to secure the corrosion resistance while lowering the surface hardness. They confirmed that by applying such stainless steel foil to the positive electrode current collector, it is possible to secure the contact area with the positive electrode mixture without breakage even with a high press pressure since the surface hardness is low and possible to secure conductivity with the positive electrode mixture. Further, they confirmed that the corrosion resistance is also secured, so it is possible to suppress corrosion of the stainless steel foil due to the electrolytic solution.

(c) They confirmed that by applying stainless steel foil having a suitably low surface hardness and having corrosion resistance to a positive electrode current collector of a secondary battery, not only is it possible to make the sheet thickness thinner than a conventional aluminum foil, but also a press pressure by which breakage occurs with aluminum foil can be withstood, so a high filling ratio of the positive electrode mixture can be achieved. In a positive electrode current collector, by making the filling ratio of the positive electrode mixture high, it is possible to cause a drop in the contact resistance with the current collector and deal with the increasingly higher voltage and increasingly higher output of secondary batteries. That is, the effect of reduction of the thickness of the current collector and the effect of the increasingly higher voltage and increasingly higher output combine to result in a current collector contributing to the increasingly smaller size and higher capacity of secondary batteries.

The present invention was made based on the above findings and has as its gist the following:

[1] A stainless steel foil current collector for secondary battery positive electrodes, comprising, by mass %,
   C: 0.001 to 0.030%,
   Si: 0.01 to 1.00%,
   Mn: 0.01 to 1.00%, and
   Cr: 12 to 18%,
   further comprising at least one of Sn and Ti,
   in which either of Sn or Ti satisfies
   (a) Sn: 0.01 to 1.00%,
   (b) Ti: a larger value of either 0.10% or 16(% C+% N) or more,
   having a balance of Fe and unavoidable impurities,
   limiting, as impurities,
   P: 0.050% or less,
   S: 0.030% or less, and
   N: 0.0300% or less,
   in which stainless steel,
   a thickness is 1 μm or more and 20 μm or less, and
   a surface hardness is a Vickers hardness of Hv300 or less,
   where, % C and % N respectively show the C content and N content contained in the stainless steel, "0" being entered if not included.

[2] The stainless steel foil current collector for secondary battery positive electrodes according to [1], wherein the stainless steel further comprises, by mass, one or more types of elements among
   Nb: 0.30% or less,
   Al: 0.500% or less,
   Ni: 0.50% or less,
   Cu: 0.50% or less,
   Mo: 0.50% or less,
   V: 0.50% or less,
   Zr: 0.50% or less,
   Co: 0.50% or less,
   Mg: 0.0050% or less,
   B: 0.0050% or less, and
   Ca: 0.0050% or less.

[3] The stainless steel foil current collector for secondary battery positive electrodes according to [1] or [2], wherein when coating a surface of the current collector with a positive electrode mixture, pressing it, then measuring the electrical contact resistance between the positive electrode active substance and the current collector, when the filling ratio of the positive electrode mixture is 74%, the electrical contact resistance is 10062 or less.

[4] The stainless steel foil current collector for secondary battery positive electrodes according to any one of [1] to [3], wherein a filling ratio of the positive electrode mixture comprised of a positive electrode active substance, conductive aid, and binder stacked on at least part of the current collector is 50% or more.

[5] The stainless steel foil current collector for secondary battery positive electrodes according to [4], wherein the positive electrode active substance is one or more types selected from $LiCoO_2$, $LiNi_{1/3}\ CO_{1/3}\ Mn_{1/3}\ O_2$, $LiMn_2O_4$, $LiNi_{0.8}\ Co_{0.15}\ Al_{0.05}O_2$, and $LiFePO_4$.

[6] The stainless steel foil current collector for secondary battery positive electrodes according to any one of [1] to [5] wherein the stainless steel is not bright annealed.

Advantageous Effects of Invention

According to the present invention, it is possible to obtain a current collector for secondary battery positive electrodes which is thin in sheet thickness, secures not only mechanical strength, but also a contact area with a positive electrode active substance or positive electrode mixture and is thereby good in contact electrical conductivity, has a high potential leach resistance, and has corrosion resistance with respect to an alkali and electrolytic solution.

The current collector of the present invention can exhibit its efficacy even in a battery where the electrolyte is other than an organic solvent (for example, an ion fluid or solid electrolyte) if having a similar electrode configuration.

BRIEF DESCRIPTION OF DRAWINGS

FIG. 2(a) is a conceptual view showing measurement guidelines. FIG. 2(b) is a conceptual view showing an equivalent electrical circuit at the time of measurement.

DESCRIPTION OF EMBODIMENTS

Figure 1:
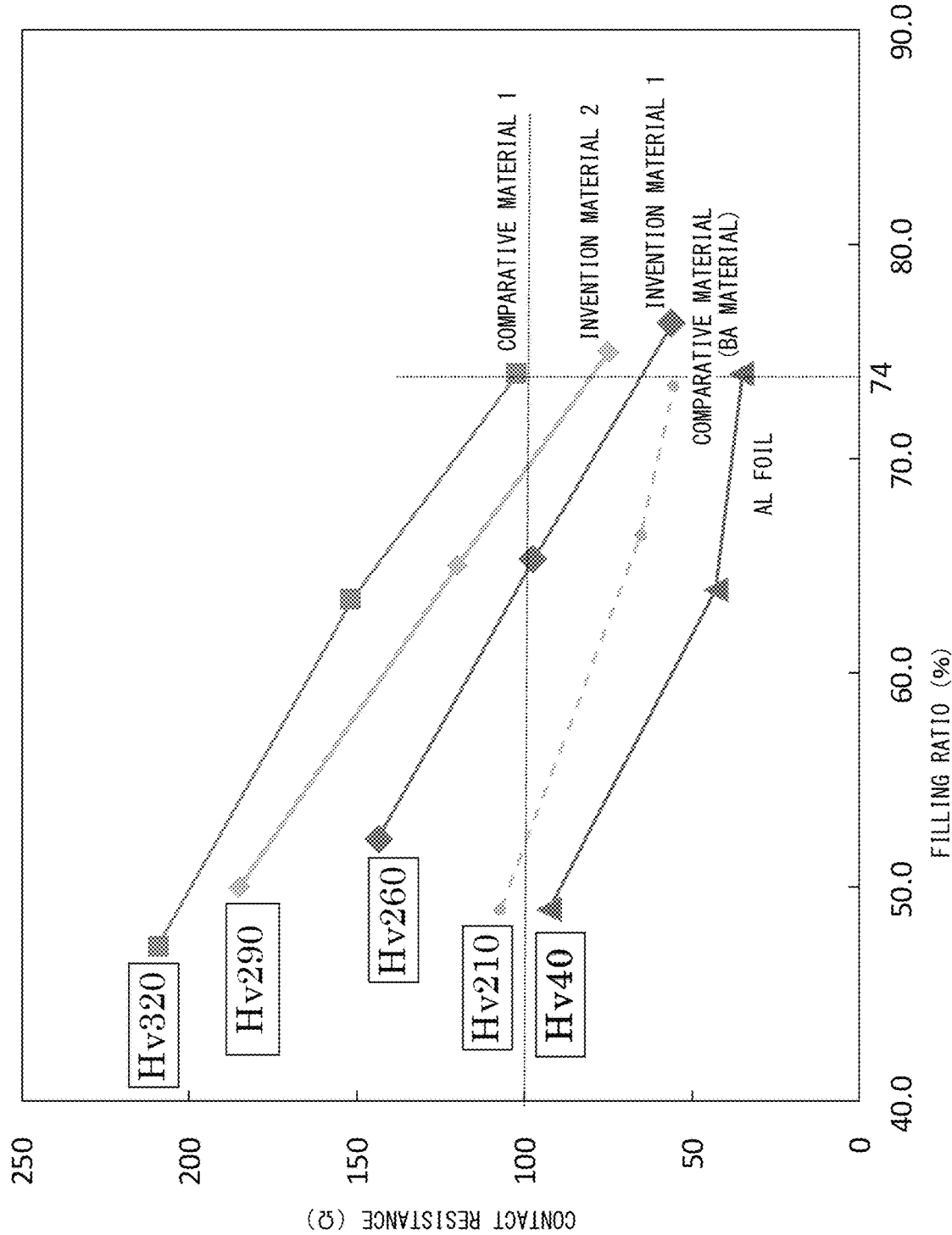
FIG. 1 is a view showing a relationship between a filling ratio of a positive electrode mixture after pressing and an electrical contact resistance.

The present invention will be explained in detail below. Note that, the "%" notations of the contents of the elements mean "mass %" unless otherwise particularly indicated.

Reasons for Limitation of Constituents

First, the reasons for limitation of the constituents of the stainless steel foil according to the present invention will be explained.

C (carbon) causes the corrosion resistance to deteriorate, so the upper limit of its content is made 0.030%. From the viewpoint of the corrosion resistance, the smaller the content the better. The upper limit is preferably made 0.020%, more preferably 0.010%, still more preferably 0.005%. Further, excessive reduction leads to an increase in the refining costs, so the lower limit of the content is made 0.001%. If considering the corrosion resistance and the manufacturing costs, the lower limit may preferably be made 0.002%.

Si (silicon) is sometimes included as a deoxidizing element. However, Si is a solution strengthening element. From suppression of the drop in workability, the upper limit is made 1.00%. From the viewpoint of the workability, the smaller the content, the better. The upper limit may preferably be made 0.60%, more preferably 0.30%, still more preferably 0.20%. Further, excessive reduction leads to an increase in the refining costs, so the lower limit of the Si content is made 0.01%. If considering the workability and manufacturing costs, the lower limit may be preferably made 0.05%.

Mn (manganese) is an element forming MnS acting as starting points of corrosion and obstructing the corrosion resistance, so the smaller the content the better. From the viewpoint of keeping the corrosion resistance from dropping, the upper limit of the content is made 1.50%. From the viewpoint of the corrosion resistance, the smaller the content the better. The upper limit may be preferably made 1.00%, more preferably 0.30%, still more preferably 0.20%. Further, excessive reduction leads to an increase in the refining costs, so the lower limit of the content of Mn is made 0.01%. Preferably, if considering the corrosion resistance and manufacturing costs, the lower limit may be preferably made 0.05%.

Cr (chrome) is a constituent element of ferritic stainless steel and an element essential for securing the corrosion resistance. To secure the corrosion resistance of the present invention, the lower limit is made 12%. However, if the content is great, the surface of the stainless steel foil is formed with a hard passive film of Cr, so the upper limit is made 18%. As explained later, from the viewpoint of the corrosion resistance, the stainless steel foil according to the present invention may contain Sn to make its corrosion resistance better. On the other hand, it is also possible to include Ti to immobilize the C and N, factors causing deterioration of the corrosion resistance, so as to make the corrosion resistance better. From the viewpoint of decreasing the surface hardness of the stainless steel foil, the content of Cr may be preferably made 17% or less or 16% or less, more preferably 15% or less. Further, from the viewpoint of securing the corrosion resistance, the content of Cr may be preferably made 13% or more, more preferably 14% or more.

Sn (tin) is an element essential for securing the corrosion resistance without relying on alloying of Cr or Mo and inclusion of the rare elements of Ni, Co, etc. To obtain a corrosion resistance equal to that of conventional stainless steel (for example, SUS430LX), the lower limit of the content of Sn was made 0.01%. To secure the corrosion resistance more, the content may be preferably made 0.05% or more, more preferably 0.10% or more. However, excessive inclusion leads to a drop in surface gloss and manufacturability. Also, the effect of improvement of the corrosion resistance becomes saturated. Therefore, the content was made 1.00% or less. If considering the corrosion resistance and the surface gloss, the content may be made 0.5% or less, more preferably 0.30% or less. Still more preferably, the upper limit may be made 0.20% or less.

Ti (titanium) is an element having the effect of preventing sensitization by Cr carbonitrides as a stabilizing element immobilizing C and N and making the corrosion resistance better. From the viewpoint of securing this effect, the content of Ti may be 0.10% or more and 16×(% C+% N) or more. (The symbol "x" showing multiplication will sometimes be omitted and 16(% C+% N) shown.) Therefore, the content of Ti may be the larger value of 0.10% or 16(% C+% N) or more. Here, % C and % N respectively show the C content (mass %) and N content (mass %) contained in the stainless steel. When not contained, "0" is entered. The upper limit of the Ti content is not particularly prescribed, but excessive inclusion invites a drop in the corrosion resistance due to the defects caused by the inclusions and the concentration of Ti in the oxide film. Therefore, the upper limit of the Ti content may be made 0.80%, preferably may be made 0.40% or less.

Sn and Ti, as explained above, are both elements for making the corrosion resistance better. From the viewpoint of making the stainless steel foil decrease in surface hardness, it is preferably make the Cr content smaller, but from the viewpoint of supplementing the corrosion resistance to make up for the amount of decrease of Cr, one or both of Sn and Ti may be contained. If including both, one of Sn or Ti should be in the above range of content.

P (phosphorus) is an impurity element and an element obstructing the manufacturability and weldability, so the content should be as small as possible. For keeping the manufacturability or weldability from falling, the upper limit of the content is made 0.050%. From the viewpoint of the manufacturability or weldability, the content should be as small as possible. The upper limit may be preferably made 0.040%, more preferably 0.030%. Further, excessive reduction leads to an increase in the refining costs, so the lower limit of the content of P may be made 0.005%. More preferably, considering the manufacturing costs, it may be made 0.010%.

S (sulfur) is an impurity element. It obstructs the corrosion resistance and the hot workability, so the content should be as small as possible. To secure the corrosion resistance and the hot workability, the upper limit of the content of S is made 0.0300%. From the viewpoint of the corrosion resistance and the hot workability, the smaller the content the better. The upper limit may be preferably made 0.0100%, more preferably 0.0050%, still more preferably 0.0030%. Further, excessive reduction leads to an increase in the refining costs, so preferably the lower limit of the content may be made 0.0001%. More preferably, considering the corrosion resistance and the manufacturing costs, it may be made 0.0002%.

In addition to the above contained elements, there are Fe (iron) and unavoidable impurities. The "unavoidable impurities" mean elements included unintentionally in the process of manufacture of the stainless steel foil current collector.

In addition to the above elements, instead of Fe, one or more of Nb: 0.30% or less, Al: 0.500% or less, Ni: 0.50% or less, Cu: 0.50% or less, Mo: 0.50% or less, V: 0.50% or less, Zr: 0.50% or less, Co: 0.50% or less, Mg: 0.005% or less, B: 0.0050% or less, Ca: 0.0050% or less, and N: 0.0300% or less may be suitably included.

Nb (niobium) is an element having the effect of improvement of the corrosion resistance in steel containing trace amounts of Sn such as the stainless steel foil of the present invention. However, excessive inclusion causes the recrystallization temperature of the steel to rise and conversely causes a decline in the corrosion resistance. Therefore, the upper limit is made 0.30%. This effect appears from 0.05% or more. Preferably, considering the corrosion resistance and manufacturability, the content may be made 0.10% or more and 0.20% or less.

Al is an element effective as a deoxidizing element. However, excessive inclusion causes deterioration of the workability or toughness and the weldability, so the upper limit of the content of Al was made 0.500%. From the viewpoint of the workability, toughness, and weldability, the content should be as low as possible. The upper limit may be preferably made 0.100%, more preferably 0.050%, still more preferably 0.030%. Further, considering the refining costs, the lower limit of the content may be made 0.005%. More preferably, it may be made 0.010%.

Ni (nickel), Cu (copper), Mo (molybdenum), V (vanadium), Zr (zirconium), and Co (cobalt) are elements making the corrosion resistance better by a synergistic effect with Sn and may be included in accordance with need. However, if over 0.50%, they invite a rise in material costs, so the upper limit of content of each may be made 0.50%. These elements are rare, so if included, the preferable ranges of Ni and Cu may be made 0.10 to 0.40% and the preferable range of Mo may be made 0.10 to 0.30%. Further, the preferable ranges of V, Zr, and Co may be made 0.02 to 0.30%. If included, they may be included in 0.01% or more where their effects appear, preferably 0.02% or more. More preferably, they may be included in 0.05% or more where the effects remarkably appear.

Mg (magnesium) together with Al forms Mg oxides in the molten steel and acts as deoxidizing agent and also acts as a nuclei for precipitation of TiN. TiN forms nuclei for solidification of the ferrite phase in the solidification process. By promoting the precipitation of TiN, it is possible to cause the formation of a fine ferrite phase at the time of solidification. By refining the solidified microstructure, it is possible to prevent ridging or roping or other surface defects caused by coarse solidified structures of the product. In addition, this may be included as needed for improving the workability. However, if over 0.005%, the manufacturability deteriorates, so the upper limit is made 0.0050%. If included, the content is made 0.0001% or more where these effects appear. Preferably, considering the manufacturability, the content is made 0.0003 to 0.0020%.

B (boron) is an element improving the hot workability and the secondary workability. Inclusion in ferritic stainless steel is effective, so this may be included as needed. However, excessive inclusion causes the elongation to fall, so the upper limit is made 0.0050%. If included, the content is made 0.0003% or more where these effects appear. Preferably, considering the cost of the materials and the workability, the content may be made 0.0005 to 0.0020%.

Ca (calcium) is an element causing hot workability and cleanliness of the steel to become better and may be included as needed. However, excessive inclusion leads to a drop in the manufacturability or a drop in the corrosion resistance due to the CaS and other water-soluble inclusions, so the upper limit is made 0.0050%. If included, the content is made 0.0003% or more where these effects are exhibited. Preferably, considering the manufacturability and corrosion resistance, the content may be made 0.0003 to 0.0015%.

N (nitrogen) is an impurity. In the same way as C, it causes the corrosion resistance to deteriorate. The smaller the content of N, the better, so the content may be restricted to 0.0300% or less. From the viewpoint of the corrosion resistance, the content should be as small as possible. The upper limit is preferably made 0.0200%, more preferably 0.0120%. Further, excessive reduction leads to an increase in the refining costs, so preferably the lower limit may be made 0.0010%. More preferably, considering the corrosion resistance and manufacturing costs, the lower limit may be made 0.0050%.

Surface Hardness: Hv300 or Less

The surface hardness of the stainless steel foil used for the stainless steel foil current collector according to the present invention is a Vickers hardness (Hv) of 300 or less. In the case of the conventionally used stainless steel (for example, the SUS304 proposed in PTL 2), if in the as rolled state (material not bright annealed or otherwise heat treated after rolling the foil), the Vickers hardness (Hv) exceeds 300 (for example, with SUS304, Hv320), so it will be understood that the stainless steel foil according to the present invention is lower in surface hardness than ordinary stainless steel foil.

FIG. 1 shows the relationship between the filling ratio of the positive electrode mixture after pressing and the electrical contact resistance (hereinafter simply referred to as the "contact resistance"). The method of measurement of the contact resistance will be explained later. As will be understood from FIG. 1, if the surface hardness falls, the contact resistance also falls. Further, the more the press pressure is raised so that the filling ratio of the positive electrode mixture rises, the more the contact resistance falls. This is believed to be because when raising the filling ratio of the positive electrode mixture by coating the current collector with the positive electrode mixture, then press working it, the positive electrode active substance in the positive electrode mixture penetrates the surface of the current collector and the contact area increases. From these facts, the lower the Vickers hardness of the surface of the stainless steel foil forming the current collector, the more preferable for the electrical characteristics. Therefore, the stainless steel foil surface hardness is preferably lower. From a comparison with a conventional material, Hv300 or less is good. Preferably, Hv290 or less.

The stainless steel foil can also be lowered in surface hardness by bright annealing (BA) the stainless steel foil after rolling the foil. However, bright annealing become expensive cost-wise, if raising the filling ratio of the positive electrode mixture, the contact resistance becomes the same extent in bright annealed stainless steel foil and not bright annealed stainless steel foil, so the effect of bright annealing can no longer be obtained (FIG. 1). For this reason, the stainless steel foil current collector for a secondary battery in the present invention can be made without bright annealing, that is, using the material as rolled.

On the other hand, from the viewpoint of the corrosion resistance, it is necessary to secure a certain Cr or other passive film on the surface of the stainless steel foil. The passive film changes in hardness due to its characteristics, but the lower limit of the surface hardness is determined from the viewpoint of securing the corrosion resistance. In the present invention, to secure a certain corrosion resistance, for example, a Cr content of 12% or more is preferable, so the surface hardness need only be Hv180 or more. The surface hardness is determined balanced with the corrosion resistance. From this viewpoint, preferably the stainless steel foil surface hardness is Hv190 or more, more preferably is Hv200 or more. Note that, the Vickers hardness may be measured based on JIS Z 2244: 2009. However, stainless steel foil is extremely thin, so the test force (indentation load of indenter) was made 5 gf.

Electrical Contact Resistance

Figure 2:
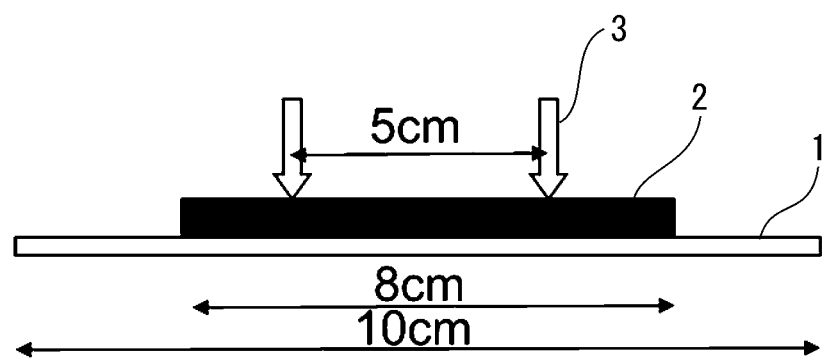
FIG. 2 is a conceptual view of measurement of the electrical contact resistance between the positive electrode mixture after pressing and the current collector.
Figure 2:
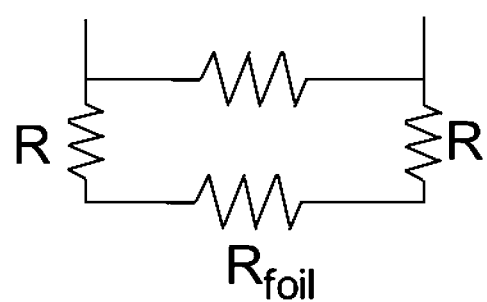

FIG. 1 shows the relationship between the filling ratio of the positive electrode mixture after pressing and the electrical contact resistance. The electrical contact resistance between the positive electrode mixture and the positive electrode current collector was measured by coating the surroundings of the positive electrode current collector with the positive electrode mixture, pressing it, then, as shown in FIG. 2(a), bringing the electrode into contact with the positive electrode mixture. At that time, the electrical resistance ($R_{film}$) of the positive electrode mixture measured in advance and the electrical resistance ($R_{foil}$) of the stainless steel foil and Al foil as a comparison were measured in advance and the resistance calculated from the following (formula 1) based on the equivalent circuit shown in FIG. 2(b):

$$1/(R \text{ measured value}) = 1/R_{film} + 1/(2 \times R + R_{foil}) \quad \text{(formula 1)}$$

As shown in FIG. 1, in the case of the stainless steel foil current collector according to the present invention, it was confirmed that when the filling ratio of the positive electrode mixture was 50%, the electrical contact resistance was 150Ω to 190Ω or so, while when the filling ratio of the positive electrode mixture was 74%, the electrical contact resistance was 100Ω or less. In the case of conventional stainless steel foil, in the as rolled material (hard material), when the filling ratio of the positive electrode mixture is 50%, the electrical contact resistance exceeds 200Ω and when the filling ratio of the positive electrode mixture is 74%, the electrical contact resistance exceeds 100Ω, so it is learned that the stainless steel foil current collector according to the present invention is low in contact resistance. From these facts, it will be understood that if, like in the stainless steel foil current collector according to the present invention, the surface hardness is Hv300 or less, when the filling ratio of the positive electrode mixture is 74%, the electrical contact resistance will become 100Ω or less.

In the case of conventional Al foil, the Vickers hardness of the Al foil surface is Hv40 or so. The result of measurement of the electrical contact resistance when applying the same press pressure is shown in FIG. 1. As a result, when the filling ratio of the positive electrode mixture is 50%, the electrical contact resistance is about 100Ω while when the filling ratio of the positive electrode mixture is 75%, the electrical contact resistance is about 40Ω. The surface is soft, so the positive electrode mixture greatly penetrates it. The contact resistance is believed to become better by that amount. However, in the case of Al foil, breakage is confirmed at the time of pressing with a positive electrode mixture filling ratio of 63%, so it was confirmed that this was not practical.

Compared with conventional Al foil, stainless steel foil is inferior in electrical conductivity, so it might seem that the electrical characteristics of the electrode as a whole deteriorate. However, as a component element of electrode resistance, there is the electrical resistance at the inside of the current collector metal needless to say, while there are also the resistance elements of the positive electrode active substance or conductive aid, binder, or interfaces of the same. Table 1 shows the electrical characteristics of the stainless steel foil according to the present invention, Al foil as a comparative material, and the conductive aid (Acetylene Black). If comparing the electrical conductivity by an evaluation indicator indexed to copper as 100%, stainless steel foil has a low one of about 2 to 3%, but compared with the conductive aid Acetylene Black, it has an electrical conductivity higher than that by five orders of magnitude. The electrical conductivities of the typical positive electrode active substances LCO, LMO, and other oxides are $10^{-9}$ to $10^{-1}$ S/cm or extremely low compared with stainless steel. Therefore, if considering the fact that the factor with the greatest resistance among the resistance factors inside a battery determines the speed of the response of the battery as a whole, it can be said that the low electrical conductivity of the stainless steel foil does not become that great a problem. Incidentally, Al foil has a conductivity of 63% that of copper and close to 20 times that of stainless steel foil. However, if considering the fact that the factor with the greatest resistance among the resistance factors inside a battery determines the speed of the response of the battery as a whole, the electrical conductivity of the stainless steel foil being lower than Al foil does not become that great a problem. Of course, by raising the press pressure and raising the filling ratio of the positive electrode mixture, the contact resistance can be halved from 150Ω to the 60Ω class. If considering this, the effect is believed to be large.

TABLE 1

| Material | Volume specific resistivity (Ωcm) | Indicator of conductivity when indexed to copper as 100 |
|---|---|---|
| Stainless steel (SUS304) | $71.2 \times 10^{-6}$ | 2.4 |
| Stainless steel (SUS444) | $53.5 \times 10^{-6}$ | 3.2 |
| Copper | $1.7 \times 10^{-6}$ | 100 |
| Aluminum | 2.7 to $3.6 \times 10^{-6}$ | 63 |
| Conductive aid (Acetylene Black) | 3 to $5 \times 10^{-10}$ | 0.00006 |

Sheet Thickness

The stainless steel foil according to the present invention has a sheet thickness of 20 μm or less. The sheet thickness of the Al foil used for conventional positive electrode current collectors is 20 μm, so a thinner sheet thickness than this is desirable. The thinner the sheet thickness of the stainless steel foil used as the current collector the better, so preferably it is made a sheet thickness of 10 μm or less, more preferably 8 μm or less, still more preferably 6 μm or less. The lower limit of the sheet thickness is not particularly prescribed. It is determined from the strength and other conditions sought or the problems in manufacturing technology. In current manufacturing technology, making the sheet thickness 1 μm or more is preferable.

Filling Ratio of Positive Electrode Mixture

Along with the improvement of the battery performance, the filling ratio of the positive electrode mixture has been trending higher. As shown in FIG. 1, if the filling ratio of the positive electrode mixture rises, the contact resistance with the current collector falls, as explained above. In the stainless steel foil current collector according to the present invention, even if the filling ratio of the positive electrode mixture is low, the contact resistance with the positive electrode mixture can be lowered compared with conventional stainless steel foil.

On the other hand, the contact resistance of the stainless steel foil current collector according to the present invention is higher compared with aluminum foil. However, if the positive electrode mixture filling ratio becomes 50% or more, in aluminum foil, the strength becomes insufficient and the foil is liable to break. If the positive electrode mixture filling ratio becomes 60% or more, the possibility of the aluminum foil breaking becomes remarkably higher. Furthermore, as will be understood from FIG. 1 as well, when the positive electrode mixture filling ratio is 65%, the stainless steel foil current collector according to the present invention has a contact resistance of the same extent as the contact resistance with a conventional aluminum foil current collector at the time of a positive electrode mixture filling ratio of 50%. From this viewpoint, the stainless steel foil current collector according to the present invention can be said to particularly exhibit its effect when press working the positive electrode mixture to a filling ratio of 50% or more. More preferably, it particularly exhibits its effect when applied to a positive electrode mixture filling ratio of 60% or more, further 65% or more, more preferably 70% or more, most preferably 75% or more.

Adding a few words for safety's sake, the stainless steel foil current collector according to the present invention needless to say can be used even with a filling ratio less than 50%. Even with a filling ratio less than 50%, it is possible to obtain a lower contact resistance compared with conventional stainless steel foil.

The filling ratio of the positive electrode mixture shows the value of the coating density of the positive electrode mixture divided by the true density of the positive electrode mixture expressed as a percentage. That is, positive electrode mixture coating density=positive electrode mixture true density=filling ratio (%).

First, the positive electrode material, conductive aid, and binder are weighed to predetermined amounts, charged into an organic solvent, and stirred to prepare a coating use slurry which is then coated using an applicator onto metal foil for forming the current collector. The organic solvent is made to dry to prepare the electrode. This electrode is roll pressed, then punched into a circular shape by a φ15 mm punch and measured for weight and thickness. The weight and thickness of metal foil punched out to the same size in advance are subtracted to obtain the weight and volume of the coated positive electrode mixture. This weight is divided by the volume to obtain the coating density of the positive electrode mixture. The true density of the positive electrode mixture can be calculated from the densities and compounding ratios of the positive electrode material, conductive aid, and binder. The filling ratio of the positive electrode mixture can be calculated from the coating density and true density of the thus obtained positive electrode mixture.

Manufacturing Method

Next, the method of manufacturing the stainless steel foil according to the present invention will be explained. The manufacturing process of the stainless steel foil according to the present invention is generally the same as the manufacturing process of usual stainless steel foil. First, the raw material is melted in a vacuum atmosphere with a true vacuum degree of $10^{-1}$ (Torr) or less. Mn, Si, Mg, Al, or another deoxidizing agent is added to adjust the composition of the melt, then the melt is cast into a slab. Note that the slab casting process may be a process for melting the above-mentioned steel composition in an electric furnace, refining the melt, then continuously casting it to manufacture a slab of a thickness of 150 mm to 250 mm. Next, the slab is hot rolled to 3.0 mm to 200 mm thickness, then coiled (coiling process). The coiled hot rolled sheet is alternately cold rolled and annealed to thereby work it into a sheet thickness 1.00 μm or more and 20.00 μm or less stainless steel foil which is then cleaned on its surface to give the final product. The number of cold rolling passes and reduction rate are not particularly limited, but the rolling is preferably performed so that the reduction rate in the foil rolling process for obtaining the final sheet thickness becomes within 5.0 to 80.0% in range. This is because the higher the reduction rate, the higher the surface hardness becomes due to the work hardening. However, the stainless steel foil according to the present invention does not have to be bright annealed (BA) after the final foil rolling pass. This is because even without performing BA, it is possible to sufficiently make the surface hardness decrease.

EXAMPLES

Example 1

Ferritic stainless steel having the constituents of Table 2 was melted and treated by normal hot rolling, pickling, cold rolling, and annealing, then was rolled into foil by ordinary foil rolling (as rolled material (hard material)) to obtain sheet thickness 10 μm stainless steel foil and prepare a sample.

The surface hardness of the obtained stainless steel foil was found based on JIS Z 2244: 2009 as the Vickers hardness. At this time, the test force (indentation load of indenter) was made 5 gf.

The corrosion resistance was found by immersing a stainless steel foil test piece in an electrolyte close to a positive electrode environment and measuring the anode current to evaluate the elution. The electrolytic solution used was one obtained by dissolving in a nonaqueous solvent (mixture of ethylene carbonate and ethyl methyl carbonate in volume ratio of 1:3) an electrolyte comprised of 1 mol/L ("L" meaning liter) of $LiPF_6$. A sample of stainless steel foil (sheet thickness 10 μm×30 mm square) was prepared and immersed in the electrolyte. As a counter electrode, an Li sheet was immersed, while as a potential reference electrode, Li foil was immersed. The anode current when the potential across electrodes (potential difference between stainless steel foil and potential reference electrode) was 3.5V and 4.0V was measured. The higher the anode current, the greater the elution, that is, the more inferior the corrosion resistance, shown.

The contact resistance was found by compression by a roll press to give a filling ratio of the positive electrode mixture of about 74% to prepare a test piece of a positive electrode current collector and the filling ratio of the positive electrode mixture, electrical resistance ($R_{film}$) of the positive electrode mixture, and electrical resistance ($R_{foil}$) of the stainless steel foil and Al foil were measured. Based on the above formula 1, the electrical contact resistance between the positive electrode mixture and the stainless steel foil current collector was measured. The type of the positive electrode mixture, the method of calculation of the filling ratio, the method of measurement of the electrical contact resistance, and other details are described in the later explained Example 2.

The measurement results are shown in Table 3. The test pieces according to the Steel 1, Steel 2, Steel 3, Steel 4, Steel 6, and Steel 9 had surface hardnesses of Hv300 or less. The electrical contact resistances exhibited were also somewhat low values. Furthermore, in was confirmed that in these test pieces, the anode currents were also small and the corrosion resistances were also relatively good.

Note that the results at test pieces obtained by BA (bright annealing) of the Steel 6 and Steel 7 as reference examples are also shown. It was confirmed that the test pieces according to the examples of the present invention were not up to the bright annealed test pieces, but had corrosion resistances and electrical contact no different from the same.

TABLE 2

(mass %)

| Steel type | C | Si | Mn | Cr | Sn | P | S | Nb | Ti | Al | Ni |
|---|---|---|---|---|---|---|---|---|---|---|---|
| Steel 1 | 0.002 | 0.05 | 0.28 | 14.0 | 0.12 | 0.002 | 0.001 | — | — | — | — |
| Steel 2 | 0.004 | 0.11 | 0.12 | 16.0 | 0.20 | 0.022 | 0.002 | — | — | — | — |
| Steel 3 | 0.003 | 0.07 | 0.08 | 14.0 | 0.12 | 0.024 | 0.001 | 0.120 | 0.086 | 0.042 | 0.070 |
| Steel 4 | 0.004 | 0.08 | 0.05 | 16.9 | 0.20 | 0.025 | 0.001 | 0.115 | 0.092 | 0.056 | 0.255 |
| Steel 5 | 0.003 | 0.08 | 0.10 | 13.6 | — | 0.027 | 0.001 | 0.003 | 0.160 | — | 0.080 |
| Steel 6 | 0.005 | 0.08 | 0.08 | 16.2 | 0.01 | 0.028 | 0.001 | 0.003 | 0.252 | 0.054 | 0.082 |
| Steel 7 | 0.003 | 0.12 | 0.14 | 18.6 | 0.00 | 0.030 | 0.001 | 0.178 | 0.117 | 0.046 | 0.090 |
| Steel 8 | 0.060 | 0.40 | 0.85 | 18.0 | 0.01 | 0.031 | 0.001 | 0.011 | 0.002 | 0.002 | 9.040 |
| Steel 9 | 0.002 | 0.05 | 0.11 | 16.0 | — | 0.025 | 0.001 | — | 0.105 | — | — |

| Steel type | Cu | Mo | V | Zr | Co | Mg | B | Ca | N |
|---|---|---|---|---|---|---|---|---|---|
| Steel 1 | — | — | — | — | — | — | — | — | — |
| Steel 2 | 0.250 | — | — | — | — | — | — | — | — |
| Steel 3 | 0.028 | 0.062 | 0.070 | — | 0.014 | — | 0.0005 | 0.0004 | 0.0100 |
| Steel 4 | 0.253 | 0.068 | 0.079 | — | 0.016 | — | 0.0005 | 0.0003 | 0.0120 |
| Steel 5 | 0.020 | 0.030 | — | — | — | — | — | — | 0.0101 |
| Steel 6 | 0.033 | 0.060 | 0.085 | — | 0.017 | — | 0.0007 | — | 0.0100 |
| Steel 7 | 0.048 | 1.780 | 0.062 | 0.0001 | 0.013 | — | 0.0003 | — | 0.0110 |
| Steel 8 | 0.310 | 0.240 | 0.100 | — | 0.260 | — | 0.0001 | — | 0.0333 |
| Steel 9 | — | — | — | — | — | — | — | — | — |

TABLE 3

| Steel type | Surface hardness (HV) | Anode current (μA/cm²) 3.5 V | Anode current (μA/cm²) 4.0 V | Contact resistance (Ω) equivalent to filling ratio 74% | Process (rolling) + BA | Remarks (FIG. 1) | |
|---|---|---|---|---|---|---|---|
| Steel 1 | 260 | 2.65 | 2.85 | 65 | 500 → 30 → 10 um | Invention Material 1 | Ex. |
| Steel 2 | 290 | 3.51 | 2.40 | 80 | 500 → 30 → 10 um | Invention Material 2 | Ex. |
| Steel 3 | 230 | 2.52 | 2.38 | 62 | 500 → 30 → 10 um | | Ex. |
| Steel 4 | 250 | 3.18 | 2.18 | 78 | 500 → 30 → 10 um | | Ex. |
| Steel 5 | 230 | 3.89 | 4.57 | 63 | 300 → 25 → 10 um | — | Comp. ex. |
| Steel 6 | 270 | 2.95 | 1.91 | 82 | 300 → 25 → 10 um | | Ex. |
| Steel 7 | 320 | 3.77 | 1.89 | 105 | 300 → 25 → 10 um | Comparative Material 1 | Comp. ex. |
| Steel 8 | 397 | 4.44 | 2.50 | 118 | 300 → 64 → 30 → 15 → 10 um | | Comp. ex. |
| Steel 9 | 240 | 2.96 | 1.92 | 73 | 300 → 25 → 10 um | | Ex. |
| Steel 6 (BA) | 237 | 2.94 | 1.94 | 64 | 300 → 25 → 10 um → BA | | Ref. ex. |
| Steel 7 (BA) | 210 | 3.94 | 1.88 | 58 | 300 → 25 → 10 um → BA | Comparative Material (BA) | Ref. ex. |

Example 2

Stainless steel foil was coated on its surface with a positive electrode mixture and pressed to form a current collector for positive electrodes. In that, the filling ratio of the positive electrode mixture and the electrical contact resistance with the stainless steel foil were measured.

For the stainless steel foil (as rolled material (hard material)), the Steel 1 of Table 2 (Invention Material 1 of FIG. 1) and the Steel 2 (Invention Material 2 of FIG. 1) and the Steel 7 (Comparative Material 1 of FIG. 1) were used. For the sheet thickness, in each case, 10 μm stainless steel foil was used. Regarding the Steel 7, to make the surface hardness change, a material treated by bright annealing (annealing temperature 500° C.) (Comparative Material (bright annealed material) of FIG. 1) and a material not treated by it (material as rolled (hard material)) (Comparative Material 1 of FIG. 1) were used. For comparison, the Al foil used for a conventional positive electrode current collector (thickness 20 μm) (Al foil of FIG. 1) was used. The surface hardnesses of the materials were also shown in FIG. 1.

As the positive electrode mixture, a positive electrode material (LiCoO₂, made by Nippon Chemical Industrial Co., Ltd., Cellseed C-5H, average particle size 6 μm), conductive aids (made by Imerys Graphite & Carbon, product names: KS6 and SUPER-C65), and binders (made by Kureha, KF Polymer #9100) were used. These were weighed by weight ratio to positive electrode material: KS6:SUPER-C65: binder=92:3:1:4, then charged into an organic solvent (NMP: N-methyl-2-pyrrolidone), stirred, and made to disperse to prepare a slurry for coating use. An applicator was used to coat this on the metal foil used for the current collector. An electrode having a coated substance weight after drying the NMP (positive electrode material+conductive aid+binder) of about 20 mg/cm² was prepared. The electrode coated with the positive electrode mixture was compressed by a roll press. It was pressed to give a filling ratio of the positive electrode mixture of generally 50%, 65%, and 74%.

In this way, a test piece of the positive electrode current collector was prepared, the filling ratio of the positive electrode mixture, the electrical resistance ($R_{film}$) of the positive electrode mixture, and electrical resistance ($R_{foil}$) of the stainless steel foil and Al foil were measured, and the electrical contact resistance of the positive electrode mixture and stainless steel foil current collector was measured based on the above formula 1. The measurement results are shown in FIG. 1.

Note that, the filling ratio of the positive electrode mixture was measured as follows: The above fabricated electrode was roll pressed, then was punched by a φ15 mm punch to a circular shape. This was measured for weight and thickness. The weight and thickness of metal foil before coating which was punched out in advance to the same size were subtracted from this to obtain the weight and volume of the coated substance. 92% of the coated substance was the material weight of the positive electrode. Cross-section of φ15 mm circular shape×thickness-coated substance volume, so positive electrode material weight: coated substance volume=positive electrode coating density is calculated. The true density of the positive electrode material is known (for example, $LiCoO_2$ is 5.2 g/cm$^3$) and can be measured as positive electrode coating density÷positive electrode material density=filling ratio (%).

As will be understood from FIG. 1, if raising the press pressure and raising the filling ratio of the positive electrode mixture, the electrical contact resistance falls. This is believed to be because the press pressure rises, the positive electrode mixture penetrates into the stainless steel foil surface, the passive film on the stainless steel foil surface is broken, and the contact area with the stainless steel foil is made to increase. In the case of Al foil as well, in the same way, it is believed that this is due to the increase in the contact area of the positive electrode mixture and Al foil. Note that, in the case of Al foil, it was confirmed that there was some breakage (pinholes and cracks starting from the same) when the positive electrode mixture filling ratio is 63% and 72%. In the stainless steel foil of the Invention Material 1 (Steel 1), the Invention Material 2 (Steel 2), and the Comparative Material 1 (Steel 5), it was confirmed that there was no breakage no matter what the filling ratio.

Note that, the present invention is not limited to the embodiments introduced in this Description.

INDUSTRIAL APPLICABILITY

The current collector according to the present invention can be utilized for the positive electrodes of lithium ion batteries and other secondary batteries.

REFERENCE SIGNS LIST 1 current collector
2 positive electrode mixture
3 electrode

The invention claimed is:

1. A stainless steel foil current collector for secondary battery positive electrodes,
comprising, by mass %,
C: 0.001 to 0.030%,
Si: 0.01 to 1.00%,
Mn: 0.01 to 1.00%, and
Cr: 12 to 18%,
further comprising at least one of Sn and Ti,
in which either of Sn or Ti satisfies
(a) Sn: 0.01 to 1.00%,
(b) Ti: greater than or equal to a larger value of either 0.10% or 16(% C+% N),
having a balance of Fe and unavoidable impurities,
limiting, as impurities,
P: 0.050% or less,
S: 0.030% or less, and
N: 0.0300% or less,
in which stainless steel,
a thickness is 1 μm or more and 20 μm or less, and
a surface hardness is a Vickers hardness of Hv300 or less,
where, % C and % N respectively show the C content and N content contained in the stainless steel, "0" being entered if not included.

2. The stainless steel foil current collector for secondary battery positive electrodes according to claim 1, wherein the stainless steel further comprises, by mass, one or more types of elements among
Nb: 0.30% or less,
Al: 0.500% or less,
Ni: 0.50% or less,
Cu: 0.50% or less,
Mo: 0.50% or less,
V: 0.50% or less,
Zr: 0.50% or less,
Co: 0.50% or less,
Mg: 0.005% or less,
B: 0.0050% or less, and
Ca: 0.0050% or less.

3. The stainless steel foil current collector for secondary battery positive electrodes according to claim 1, wherein when coating a surface of the current collector with a positive electrode mixture, pressing it, then measuring the electrical contact resistance between the positive electrode active substance and the current collector, when the filling ratio of the positive electrode mixture is 74%, the electrical contact resistance is 100Ω or less.

4. The stainless steel foil current collector for secondary battery positive electrodes according to claim 1, wherein a filling ratio of the positive electrode mixture comprised of a positive electrode active substance, conductive aid, and binder stacked on at least part of the current collector is 50% or more.

5. The stainless steel foil current collector for secondary battery positive electrodes according to claim 4, wherein the positive electrode active substance is one or more types selected from $LiCoO_2$, $LiNi_{1/3}Co_{1/3}Mn_{1/3}O_2$, $LiMn_2O_4$, $LiNi_{0.8}Co_{0.15}Al_{0.05}O_2$, and $LiFePO_4$.

6. The stainless steel foil current collector for secondary battery positive electrodes according to claim 1 wherein the stainless steel is not bright annealed.

7. A secondary battery comprising a positive electrode having the stainless steel foil current collector for secondary battery positive electrodes according to claim 1.

* * * * *